United States Patent Office 3,455,947
Patented July 15, 1969

3,455,947
PRODUCTION OF 4-FORMYLMETHYLENE-OXAZOLIDINONES-(2)
Matthias Seefelder, Ludwigshafen (Rhine), Germany, assignor to Badische Anilin- & Soda-Fabrik Aktiengesellschaft, Ludwigshafen (Rhine), Germany
No Drawing. Filed Oct. 27, 1966, Ser. No. 589,815
Claims priority, application Germany, Nov. 25, 1965, B 84,687
Int. Cl. C07d 85/28; C09b 55/00
U.S. Cl. 260—307          2 Claims

ABSTRACT OF THE DISCLOSURE

Production of 4-formylmethylene-oxazolidinones-(2) comprising reacting 4-methylene-oxazolidinones-(2) with a formamido chloride at temperatures of 0° to 120° C. in the presence of hydrocarbons, chlorohydrocarbons or ethers which are inert under the reaction conditions and subsequently hydrolyzing the reaction product by treating it with aqueous solutions of alkali metal or alkali earth metal hydroxides.

---

The present invention relates to a process for the production of 4-formylmethylene-oxazolidinones-(2) and to the products obtained by said process.

It is an object of the invention to provide a process for obtaining the 4-formylmethylene-oxazolidinones-(2) which were not hitherto known. Another object of the invention is to provide a process in which 4-formylmethylene-oxazolidinones-(2) are obtained in good yields. A further object of the invention is to provide a process in which a plurality of substituted 4-formylmethylene-oxazolidinones-(2) is obtained. Other objects and advantages of the invention will become apparent from the following detailed description.

In accordance with the invention these objects and advantages are achieved by reacting 4-methylene-oxazolidinones-(2) having the formula $$H_2C=C \underset{R-N}{\overset{R^1}{\underset{\diagdown}{\phantom{X}}}}\!\!\underset{\diagup}{\overset{\diagup}{\underset{C}{\phantom{X}}}}\!\!\underset{O}{\overset{\diagdown}{\phantom{X}}}\!\!\overset{|}{C}-R^2 \quad \text{(I)}$$

in which each of R, $R^1$ and $R^2$ denotes an aliphatic, cycloaliphatic, araliphatic or aromatic radical with up to twelve carbon atoms, $R^1$ and $R^2$ may also denote joint memebrs of a 5- to 12-membered cycloaliphatic ring and $R^1$ may also denote a hydrogen atom, with formamido chlorides having the formula $$\left[ \underset{R^4}{\overset{R^3}{\diagdown}}\!\!N=CHCl \right]^{(+)} Cl^{(-)} \quad \text{(II)}$$

in which each of $R^3$ and $R^4$ denotes an aliphatic hydrocarbon radical with one to four carbon atoms or an aryl radical with six to ten carbon atoms, and $R^3$ and $R^4$ together with the nitrogen atom which they substitute and if desired with another hetero atom may denote members of a heterocyclic ring having preferably five or six members, at temperatures of 0° to 120° C. in an inert solvent and subsequently hydrolyzing the reaction product by treating it with alkaline agents.

The formylation of ring systems and compounds having an activated hydrogen atom with formamido chloride is widely used. However it was surprising that formamido chlorides react with the methylene group of 4-methylene-oxazolidinones-(2). The reaction proceeds according to the following equation:

$$H_2C=\!\!\underset{R-N}{\overset{R^1}{\underset{\diagdown}{\phantom{X}}}}\!\!\underset{\diagup}{\overset{\diagup}{\underset{C}{\phantom{X}}}}\!\!\underset{O}{\overset{\diagdown}{\phantom{X}}}\!\!\overset{|}{R^2} + \left[ \underset{R^4}{\overset{R^3}{\diagdown}}\!\!N=CHCl \right]^{(+)} Cl^{(-)} \xrightarrow{-HCl}$$

$$\underset{R^4}{\overset{R^3}{\diagdown}}\!\!\overset{(+)}{N}=CH\cdot CH=\!\!\underset{R-N}{\overset{R^1}{\underset{\diagdown}{\phantom{X}}}}\!\!\underset{\diagup}{\overset{\diagup}{\underset{C}{\phantom{X}}}}\!\!\underset{O}{\overset{\diagdown}{\phantom{X}}}\!\!\overset{|}{R^2} \quad Cl^{(-)} \xrightarrow{H_2O}$$

$$\underset{H}{\overset{O}{\overset{\|}{C}}}-CH=\!\!\underset{R-N}{\overset{R^1}{\underset{\diagdown}{\phantom{X}}}}\!\!\underset{\diagup}{\overset{\diagup}{\underset{C}{\phantom{X}}}}\!\!\underset{O}{\overset{\diagdown}{\phantom{X}}}\!\!\overset{|}{R^2} + \left[ \underset{R^4}{\overset{R^3}{\diagdown}}\!\!NH_2 \right]^{(+)} Cl^{(-)}$$

In the preferred starting substances I each of R, $R^1$ and $R^2$ denotes an alkyl, cycloalkyl, aralkyl or aryl radical having up to ten, preferably up to eight, carbon atoms, such as methyl, ethyl, isopropyl, butyl, buten-(3)-yl-(1), octyl, cyclohexyl, cyclooctyl, β-phenylethyl, phenyl and naphthyl radicals. The radicals may bear one to three inert substituents, such as halogen atoms, e.g. chlorine or bromine atoms, alkoxy groups having one to four carbon atoms or nitro groups. $R^1$ may also denote a hydrogen atom and $R^1$ and $R^2$ may also denote joint members of a cycloalkane ring with 5 to 12 members in the preferred starting substances II. Starting substances having Formula II may be advantageously prepared according to the processes disclosed in U.S. patent specification 2,844,590 and German patent specification 1,151,507. Examples of preferred compounds which may be used according to the method of the present invention are 3-phenyl-4-methylene-5,5 - dimethyl-oxazolidinone-(2), 3-cyclohexyl-4-methylene - 5,5-dimethyl-oxazolidinone-(2), 3-n-butyl-4-methylene-5,5-dimethyl-oxazolidinone-(2), 3-cyclooctyl-4-methylene - 5,5 - dimethyl-oxazolidinone-(2), 3-cyclohexyl-4-methylene - 5,5-pentamethylene-oxazolidinone-(2), 3-n-butyl-4-methylene-5,5-pentamethylene-oxazolidinone-(2), 3-benzyl-4-methylene-5-methyl-5-ethyl-oxazolidinone-(2), 3 - (3-methoxypropyl)-4-methylene-5-methyl-5-ethyl-oxazolidinone-(2), 3-methyl-4-methylene-5,5-dimethyl-oxazolidinone-(2), 3-cyclododecyl-4-methylene-5,5-dimethyl-oxazolidinone-(2), 3-ethyl-4-methylene-5-phenyl-5-methyl-oxazolidine-(2), 3-ethyl-4-methylene-5,5-heptamethylene-oxazolidinone-(2), 3-(4-chlorophenyl)-4-methylene-5,5-dimethyl-oxazolidinone-(2), and 3-(4-nitrophenyl)-4-methylene-5,5-dimethyl-oxazolidinone-(2).

In the preferred formamido chlorides having Formula II each of $R^3$ and $R^4$ denotes an alkyl radical with one to four carbon atoms or an aryl radical with six to ten carbon atoms, such as methyl, ethyl, isopropyl, butyl or phenyl radicals. $R^3$ and $R^4$ together with the nitrogen atom which they substitute and if desired with another hetero atom, e.g. oxygen, sulfur or nitrogen, may denote members of a heterocyclic ring having preferably 5 to 6 members. Formamido chlorides are prepared for example from N,N-dimethyl formamide, N-methyl formanilide, N-formyl piperidine, N-formyl pyrrolidone, N-formyl morpholine and inorganic acid chlorides. Suitable acid chlorides are phosgene, thionyl chloride, phosphorus oxychloride, phosphorus trichloride and sulfuryl chloride.

As a rule the 4-methylene-oxazolidinones-(2) and the formamido chlorides are reacted in stoichiometric proportions. However it is advantageous to use an excess of formamido chloride, e.g. up to about 20 mole percent, with reference to the 4-methylene-oxazolidinone-(2).

The reaction proceeds at temperatures between 0° and 120° C., the best results being obtained between 10° and 80° C. It is advantageous to carry out the reaction in a solvent which is inert under the reaction conditions and whose boiling point is between 40° and 200° C. Examples of suitable solvents are hydrocarbons such as cyclohexane or toluene, chlorohydrocarbons such as chloroform and carbon tetrachloride, and ethers such as tetrahydrofuran, dioxane and glycol dimethyl ether.

The reaction product is hydrolyzed in the conventional way, preferably by treating it with aqueous alkaline reagents with water as the solvent at a pH value of 7.5 to 10, it being an advantage to operate at elevated temperatures up to about 100° C. It is expedient to remove the solvent before the hydrolysis.

According to the invention the reaction can be carried out, for example, by placing the solution of a N,N-disubstituted formamide in an inert solvent in a stirred vessel and metering in the equivalent amount of one of the said inorganic acid chlorides in substance or in solution with slight cooling. A 4-methylene-oxazolidinone-(2) is added to the solution of the formamido chloride and it must be ensured that the reactants are intimately mixed. It is advantageous to allow the reaction to proceed first at low temperatures, preferably between 10° and 40° C., and then heat the mixture for a time, e.g., two to four hours, at a higher temperature of between 50° and 80° C. The greater part of the inert solvent is then advantageously distilled off. The residue is dissolved advantageously in water and it is expedient to remove the impurities, e.g., by filtration over active charcoal. The reaction product is hydrolyzed by adding an equivalent amount, with reference to the formamido chloride, of caustic alkali solution, e.g. caustic soda solution and heating it for a short period to preferably 50° to 90° C. The reaction product is precipitated out on cooling and can be isolated by conventional methods such as filtering or centrifuging. For further purification the product can be recrystallized from a suitable solvent.

The industrial utility of the compounds prepared according to the process of the present invention is illustrated by the following example. If 3-phenyl-4-formylmethylene-5,5-dimethyl-oxazolidinone-(2) is reacted with p-anisidine, a yellow dye is obtained which is suitable for dyeing fabric and fibres of polyacrylonitrile.

The invention is illustrated by the following examples in which the parts specified are parts by weight.

Example 1

A solution of dimethylformamido chloride is prepared by introducing 30 parts of phosgene into a solution of 19 parts of dimethyl formamide in 400 parts of chloroform. 51 parts of 3-phenyl-4-methylene-5,5-dimethyl-oxazolidinone-(2) is added to this solution. The mixture is stirred for six hours at room temperature and then heated at reflux temperature for a further two hours. The greater part of the solvent is distilled off and the residue is allowed to cool. The residue is dissolved in hot water and after being filtered with animal charcoal is made alkaline with caustic soda solution. On cooling, 3-phenyl-4-formylmethylene-5,5-dimethyl-oxazolidinone-(2) is precipitated in the form of colorless crystals having a melting point of 169° to 171° C. They are suction filtered and dried in vacuo. The yield is 38 parts (65% of the theory).

Example 2

28 parts of N-formyl-piperidine is added to a solution of 30 parts of phosgene in 300 parts of chloroform at 0° to 5° C. and the mixture is stirred for two hours at room temperature until the formation of the amido chloride is complete. Then, while cooling, 52 parts of 3-cyclohexyl-4-methylene-5,5-dimethyl-oxazolidinone-(2) is added and the whole is heated for about three hours at reflux temperatures until the evolution of gas caused by the reaction has finished. The solvent is distilled off in vacuo. The residue is dissolved in hot water and the solution is filtered with animal charcoal and then made alkaline. On cooling, 3 - cyclohexyl - 4 - formylmethylene - 5,5 - dimethyl-oxazolidinone-(2) is precipitated. It is suction filtered and recrystallized from methyl glycol. 48 parts (81% of the theory) of 3-cyclohexyl-4-formylmethylene-5,5-dimethyl-oxazolidinone-(2) is obtained having a melting point of 192° to 194° C.

Example 3

61 parts of 3-n-butyl-4-methylene-5,5-dimethyl-oxazolidinone-(2) is fed below 40° C. into a solution of dimethylformamido chloride prepared from 40 parts of phosgene and 24 parts of dimethyl formamide in 400 parts of chloroform. The mixture is then heated for three hours at reflux temperature and the solvent is distilled off in vacuo. The aldehyde is isolated as described in Example 1. The crude product is recrystallized from cyclohexane. 38 parts (72% of the theory) of 3-n-butyl-4-formylmethylene-5,5-dimethyl-oxazolidinone-(2) is obtained which melts at 71° to 73° C.

Example 4

34 parts of N-methyl formanilide is added to a solution of 30 parts of phosgene in 400 parts of chloroform at 5° to 10° C. and the mixture stirred for two hours at room temperature until the formation of the amido chloride is complete. 51 parts of 3-phenyl-4-methylene-5,5-dimethyl-oxazolidinone-(2) is added to the solution and the whole is heated for five hours at reflux temperature. The solution is worked up as described in Example 1 and 40 parts (69% of the theory) of 3-phenyl-4-formylmethylene-5,5-dimethyl-oxazolidinone-(2) is obtained which melts at 168° to 170° C.

Example 5

18 parts of dimethyl formamide is metered into a solution of 38.5 parts of phosphorus oxychloride in 300 parts of chloroform while cooling and the mixture is stirred for two hours at 20° C. After 51 parts of 3-phenyl-4-methylene-5,5-dimethyl-oxazolidinone-(2) has been added to the solution, the whole is stirred for an hour at 30° C. and for two hours at 60° C. The solvent is distilled off in vacuo. The residue is treated with cold dilute caustic soda solution and first dissolves in the latter. After a short time a crystalline precipitate is deposited. The precipitate is suction filtered and recrystallized from methyl glycol. 38 parts (65.5% of the theory) of 3-phenyl-4-formylmethylene-5,5-dimethyl-oxazolidinone-(2) having a melting point of 168° to 170° C. is obtained.

Example 6

62 parts of 3-cyclohexyl-4-methylene-5,5-pentamethylene-oxazolidinone-(2) is added to a solution of dimethylformamido chloride prepared as described in Example 1. After the mixture has been stirred for two hours at 10° to 15° C. and for two hours at reflux temperature, it is worked up as described in Example 1. After recrystallization from methyl glycol, 58 parts (84% of the theory) of 3 - cyclohexyl - 4 - formylmethylene-5,5-pentamethylene-oxazolidinone-(2) with a melting point of 180° to 182° C. is obtained.

Example 7

A solution of dimethylformamido chloride is prepared as described in Example 1 and then added to a solution of 56 parts of 3 - n - butyl-4-methylene-5,5-pentamethylene-oxazolidinone-(2) in 100 parts of chloroform, the temperature being kept below 40° C. The mixture is stirred for six hours at 40° C. and then worked up as described in Example 1. The crude product is recrystallized from ethanol. 46 parts (72% of the theory) of 3-butyl-4-formylmethylene - 5,5-pentamethylene-oxazolidinone-(2) with a melting point of 78° to 80° C. is obtained.

Example 8

58 parts of 3-benzyl - 4 - methylene - 5-methyl-5-ethyl-oxazolidinone-(2) is fed into a solution of dimethylformamido chloride prepared as described in Example 1 without cooling, the temperature rising to 60° C. The solution is kept at 60° C. for a further two hours and is then worked up as described in Example 1. After the crude product has been recrystallized from ethanol, 44 parts (68% of the theory) of 3-benzyl-4-formylmethylene-5-methyl-5-ethyl-oxazolidinone-(2) with a melting point of 106° to 108° C. is obtained.

Example 9

53 parts of 3(3' - methoxy) - propyl - 4 - methylene-5-methyl-5-ethyl-oxazolidinone-(2) is reacted at 20° C. with a solution of dimethylformamido chloride, prepared as described in Example 1. When the reaction is over, the solvent is removed in vacuo and the residue is dissolved in hot water and filtered with active carbon. The solution is then made alkaline with caustic soda solution. The alkaline solution is extracted four times with 100 parts of chloroform. After the water has been separated the organic phase is dried and the solvent distilled off again. 33 parts (55% of the theory) of 3-(3'-methoxy)-propyl-4-formylmethyl-methylene-5-methyl-5-ethyl-oxazolidinone-(2) is obtained as a slowly crystallizing oil which melts at 34° to 37° C. and gives a semicarbazone with a melting point of 182° to 183° C.

I claim:
1. A compound of the formula

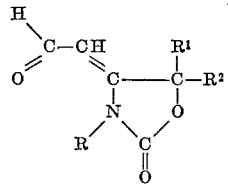

in which R denotes a member selected from the group consisting of alkyl and cycloalkyl of up to 8 carbon atoms, lower alkoxy-lower alkyl, phenyl, halo-substituted phenyl, nitro-substituted phenyl and benzyl, $R^1$ and $R^2$ denote alkyl of 1 to 4 carbon atoms and $R^1$ and $R^2$ may also denote joint members of a cyclohexane ring and R may also denote a hydrogen atom.

2. The compound of the formula

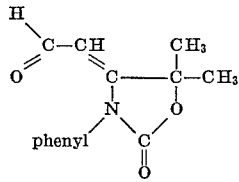

References Cited

Minkin et al., Russian Chemical Reviews, Uspekhi Khimii, vol. 29, No. 11, November 1960, p. 606 relied on.

ALEX MAZEL, Primary Examiner

R. V. RUSH, Assistant Examiner

U.S. Cl. X.R.

8—55; 260—240